(12) United States Patent
Raeder et al.

(10) Patent No.: US 10,029,704 B2
(45) Date of Patent: Jul. 24, 2018

(54) CONSIST ADHESION LEVEL CONTROL SYSTEM FOR LOCOMOTIVES

(71) Applicant: Electro-Motive Diesel, Inc., LaGrange, IL (US)

(72) Inventors: Benjamin A. Raeder, Mount Prospect, IL (US); Gregory R. Kupiec, Lemont, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 173 days.

(21) Appl. No.: 15/228,513

(22) Filed: Aug. 4, 2016

(65) Prior Publication Data

US 2018/0037237 A1 Feb. 8, 2018

(51) Int. Cl.
*B61C 15/14* (2006.01)
*B61C 5/00* (2006.01)
*B61C 15/08* (2006.01)

(52) U.S. Cl.
CPC ............... *B61C 15/14* (2013.01); *B61C 5/00* (2013.01); *B61C 15/08* (2013.01)

(58) Field of Classification Search
CPC ............ B61C 15/14; B61C 15/08; B61C 5/00
See application file for complete search history.

(56) References Cited

U.S. PATENT DOCUMENTS

| | | | |
|---|---|---|---|
| 5,775,228 A | 7/1998 | Lamba et al. | |
| 6,456,908 B1 | 9/2002 | Kumar | |
| 8,239,078 B2 | 8/2012 | Siddappa et al. | |
| 8,371,231 B2 | 2/2013 | Kumar et al. | |
| 8,649,921 B2* | 2/2014 | Herden | B61L 15/0081 246/122 R |
| 8,677,909 B2 | 3/2014 | Kumar et al. | |
| 8,768,544 B2 | 7/2014 | Schroeck et al. | |
| 9,067,607 B2 | 6/2015 | Donnelly, III | |
| 9,221,479 B2* | 12/2015 | Linares | B61L 15/0036 |
| 2007/0173990 A1 | 7/2007 | Smith et al. | |
| 2009/0099714 A1 | 4/2009 | Kumar et al. | |
| 2012/0150370 A1* | 6/2012 | Oldknow | B61K 3/00 701/19 |
| 2014/0252174 A1 | 9/2014 | Melas et al. | |
| 2016/0090107 A1 | 3/2016 | Deshpande et al. | |
| 2016/0159379 A1 | 6/2016 | Raeder et al. | |

* cited by examiner

*Primary Examiner* — Ian Jen
(74) *Attorney, Agent, or Firm* — Miller, Matthias & Hull

(57) ABSTRACT

A system for adjusting wheel adhesion levels on multiple locomotive axles in a rail vehicle consist is provided. The system includes a first controller associated with a lead locomotive and a second controller associated with at least one trailing locomotive. A wheel adhesion level sensor is configured to detect a low wheel adhesion level at an axle and transmit that information to the first or second controller. The first controller adjusts the load being delivered to the axles by the motor in response to the low wheel adhesion level.

20 Claims, 3 Drawing Sheets

CONSIST ADHESION LEVEL CONTROL SYSTEM FOR LOCOMOTIVES

TECHNICAL FIELD

The present disclosure relates generally to rail vehicle consists and, more particularly, to a system and method of controlling locomotive wheel adhesion levels in a rail vehicle consist.

BACKGROUND

A rail vehicle consist generally includes two or more rail vehicles that are mechanically coupled together to travel along a set of rails. A train is one example of such a rail vehicle consist. Typically, the train may include one or more powered locomotives and one or more non-powered rail cars. For example, a rail vehicle consist may include a master or lead locomotive, one or more trailing locomotives linked behind the lead locomotive, and one or more non-powered rail cars linked behind the one or more trailing locomotive. The number and type of rail vehicles may differ from this example.

The lead locomotive typically has a power source installed thereon, for example, a diesel engine for generating driving power to propel the locomotive along the rails. In some cases, the trailing locomotives may also have power sources installed thereon.

An operator is generally seated in the lead locomotive for operating the consist. The operator must be able to obtain data, such as throttle level and tractive effort level, associated not only with the lead locomotive but also the trailing locomotives, and to operate certain systems not only in the lead locomotive but also in the trailing locomotives.

For this reason, the lead locomotive and the one or more trailing locomotives may communicate with each other via a data communication system. The data commination system may be a hardwired multi-unit (MU) cable or, in more modern consists, an interconsist communication (ICC) system such as that described in co-owned United States Patent Publication Nos. 2014/0252174 and 2016/0159379.

Each locomotive also is equipped with multiple axles, a typical number being six. Each axle drives a set of wheels and is itself be driven by an electronically controlled traction motor. However, such wheels may slip when engaged on the rails of a given track. Since wheel slippage reduces fuel efficiency, it is important to optimize the adhesion between each wheel and the rails.

Wheel adhesion is a function of the coefficient of friction and a locomotive adhesion variable. Wheel adhesion is used to determine the tractive effort of each locomotive, or the force generated by the locomotive's engine or motor to move the consist. The more tractive effort a locomotive can produce, the fewer locomotives that are needed to run freight. Creating even a couple percent more tractive effort is a worthwhile objective.

The above need for improved wheel adhesion is even more acute when understanding that the operator controls the locomotive engine speed via a throttle which typically can be set to a discrete number of levels (typically numbered zero through eight) via mechanical notches. To increase the speed of a train gradually, the operator may move the throttle one notch at a time, sending a signal to the controller to increase engine speed by only that defined amount. When a train is operating in the middle throttle notches, increasing wheel adhesion can enable the locomotives to be run at a lower throttle notch and therefore save fuel and reduce emissions.

Thus the present disclosure is directed to a system and method of improving locomotive wheel adhesion and thus tractive effort in a multi-locomotive consist.

SUMMARY

In accordance with one aspect of the disclosure, a rail vehicle consist is provided comprising a lead locomotive including and one or more trailing locomotives coupled to the lead locomotive. The lead locomotive includes a first controller. The first controller may be a computer or other processing device, and may be used to process data received from and send commands to other devices. Each trailing locomotive may include a second controller in communication with the first controller and a power source for directing power to one or more axles. Each axle carries a set of wheels and may be driven by a traction motor. Each trailing locomotive may further comprise a wheel adhesion level sensor in communication with the second controller. The wheel adhesion level sensor is configured to detect wheel adhesion level at any axle and transmit information regarding wheel adhesion level to the second controller. The second controller is configured to receive the information regarding wheel adhesion level from the wheel adhesion level sensor and transmit that information to the first controller. The first controller is configured to adjust the load being delivered to the axle by the motor in response to the wheel adhesion level information.

In accordance with another aspect of the disclosure, a system for adjusting wheel adhesion levels on multiple locomotive axles in a rail vehicle consist is provided. The consist has a load and comprises a lead locomotive and one or more trailing locomotives coupled to the lead locomotive. Each locomotive comprises a power source for directing power to one or more axles, with each axle carrying a set of wheels and being driven by a corresponding traction motor. The system further comprises a first controller associated with the lead locomotive and a second controller associated with at least one of the trailing locomotives and in communication with the first controller. The system further comprises a first wheel adhesion level sensor in communication with the first controller and a second wheel adhesion level sensor in communication with each second controller. Each wheel adhesion level sensor is configured to detect a wheel adhesion level at an axle and transmit that level to one of the first or second controllers. The second controller is configured to receive wheel adhesion level information from a second wheel adhesion level sensor and send that information to the first controller. The first controller is configured to adjust the load being delivered to the axles by the motor in response to the wheel adhesion level information.

In accordance with still another aspect of the disclosure, a method for adjusting an adhesion level of at least one locomotive axle in a rail consist is provided. The method may comprise the steps of: monitoring the adhesion level of an axle associated with the lead locomotive via a wheel adhesion level sensor using a first controller associated with the lead locomotive; monitoring the adhesion level of an axle associated with a trailing locomotive via a wheel adhesion level sensor using a second controller associated with the trailing locomotive; communicating a low adhesion level signal to a first or second controller when the wheel adhesion level sensor monitors an adhesion level of an axle lower than a predetermined level; and adjusting the power being delivered to the low adhesion level axle by the power source in response to the low adhesion level signal.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

The present disclosure provides a system and method for adjusting the adhesion level on multiple locomotive axles to improve tractive effort and reduce fuel consumption. Before describing such a system and method, certain definitions germane to its understanding are set forth below. As used herein, "Adhesion level", "Wheel adhesion level" and "Traction" all refer to a measure of the level of adhesion or traction between a wheel and the rail. "Consist" is used to refer to a linked grouping of train cars and/or locomotives, while "Load" refers to the weight pulled by the wheels of the consist. Finally, "Tractive Effort" refers to the amount of force generated by the locomotive's engine or motor to move the consist, and "Wheel Adhesion Level Sensor" refers to any sensor capable of sensing the wheel adhesion level of a wheel or set of wheels, including but not limited to a speed sensor.

Figure 1:
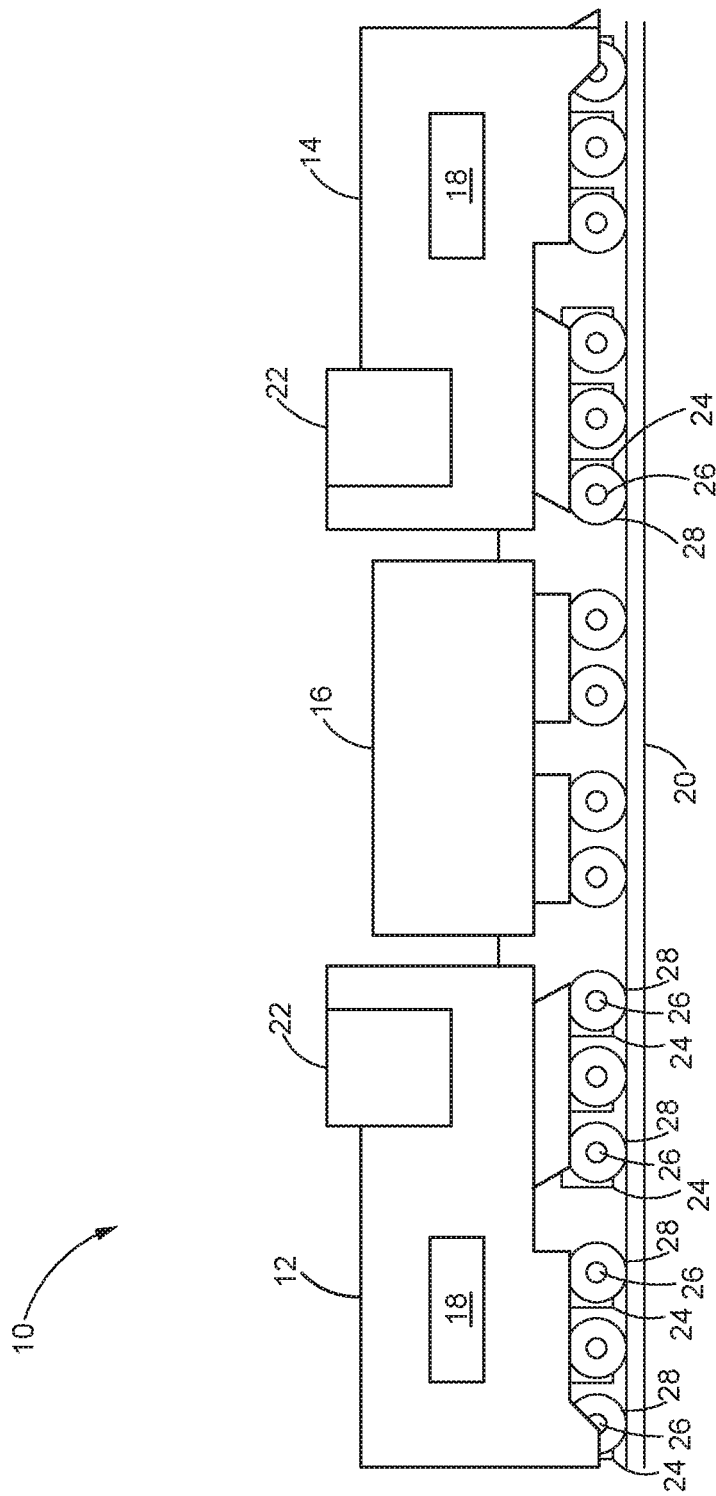
FIG. 1 is a schematic diagram of a train consist.

Referring now to FIG. 1, an exemplary rail vehicle consist 10 is shown. The consist 10 may comprise a master unit or lead locomotive 12, at least one trailing unit or trailing locomotive 14 and one or more non-powered rail cars 16. The at least one trailing locomotive 14 and the one or more non-powered rail cars 16 may be mechanically coupled to the lead locomotive 12. Although the lead locomotive 12 may be the first locomotive in the consist 10 in the direction of travel, it should be understood that the lead locomotive 12 may be generally described as the locomotive within the consist 10 in which an operator may ride and may be located in various positions relative to the at least one trailing locomotive 14. Thus, the at least one trailing locomotive 14 may be located before or after the lead locomotive 12 in the direction of travel of the rail vehicle consist 10.

The lead locomotive 12 has a power source installed thereon, for example, a diesel engine 18 for generating driving power to propel the locomotive 12 along the rails 20.

Likewise, the trailing locomotives 14 may also have power sources such as a diesel engine 18 installed thereon. The diesel engine 18 powers one or more traction motors 24. Each traction motor 24 turns a corresponding axle 26. Each axle 26 is then in turn connected to a set of wheels 28.

A cab 22 may be provided in the lead locomotive 12 for an operator who operates the consist 10. The operator may control not only the lead locomotive 12 but also the trailing locomotives 14. To do so, the operator must be able to obtain data associated not only with the lead locomotive 12 but also the trailing locomotives 14 and to operate certain systems not only in the lead locomotive 12 but also in the trailing locomotives 14. For this reason, the lead locomotive 12 and the one or more trailing locomotives 14 may communicate with each other via a data communication system described in more detail below.

Figure 2:
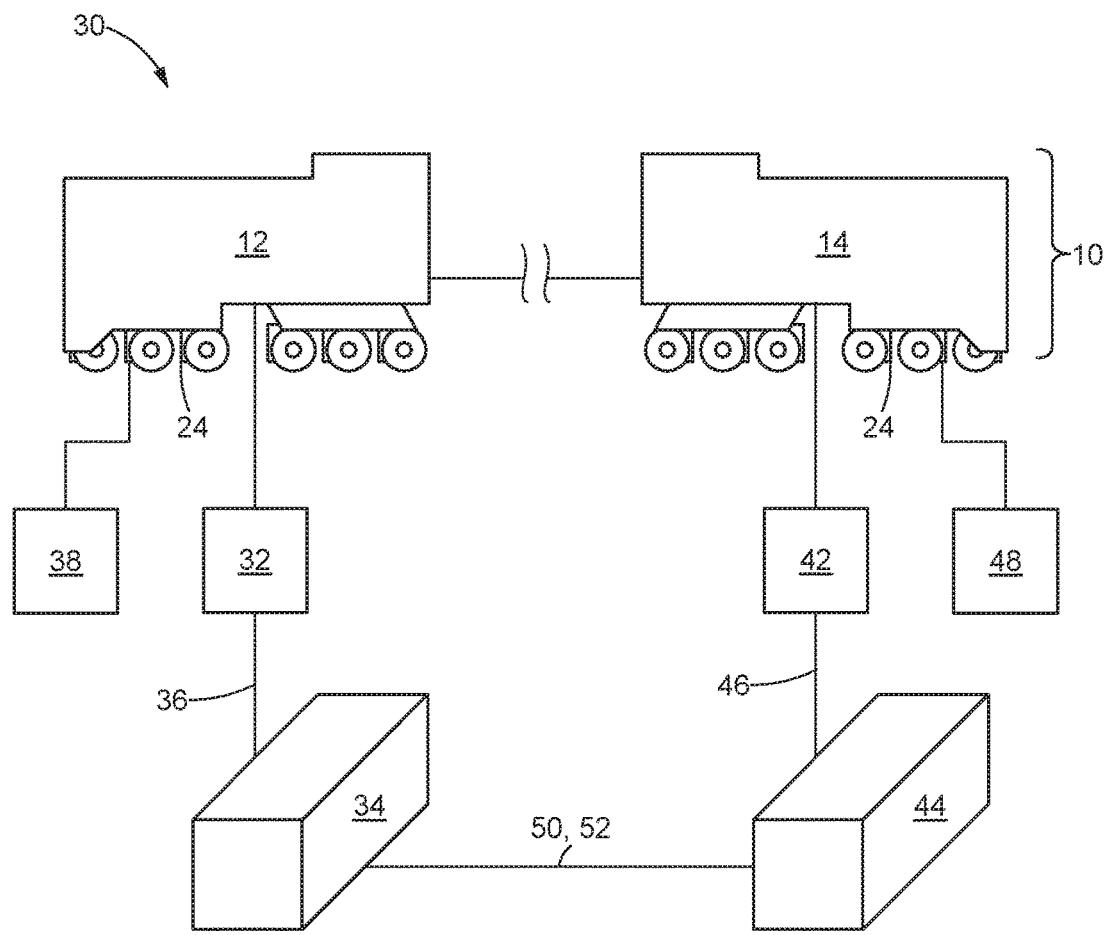
FIG. 2 is a schematic diagram of an exemplary system for improving traction control in a train consist.

FIG. 2 is a schematic diagram of an exemplary system 30 for improving wheel adhesion/traction control in a train consist 10 constructed in accordance with the present disclosure. The system 30 may comprise a first locomotive controller 32 in communication with a first interconsist communication (ICC) device 34. The first locomotive controller 32 monitors the operation of the lead locomotive 12 and can send and receive data and commands regarding the monitored operations. The first interconsist communication (ICC) device 34 may be installed in the cab 22 of the lead locomotive 12, but other installation configurations are possible.

The system 30 may also comprise a second locomotive controller 42 in communication with a second interconsist communication (ICC) device 44. The second locomotive controller 42 monitors the operation of the trailing locomotive 14 and can send and receive data and commands regarding the monitored operations. The second interconsist communication device 44 may be installed in the cab 22 of the trailing locomotive 14 but other installation configurations are similarly possible.

As a non-limiting example, each of the first and second locomotive controllers 32, 42 may be a computer or other type of data processor, and each of the first and second interconsist communication devices 34, 44 may be a smart interconsist communication device.

The lead locomotive 12 and the at least one trailing locomotive 14 may also be in communication via a communication link 50, which may be any wired or wireless link. As an example of a wired link, the communication link 50 may include a multiple unit (MU) jumper cable 52 coupling the lead locomotive 12 to the at least one trailing locomotive 14. One end of the MU jumper cable 52 may be coupled to the first interconsist communication device 34 via first train line wires 36, while the other end of the MU jumper cable 52 may be coupled to the second interconsist communication device 44 via second train line wires 46 so that the first locomotive controller 32 may communicate with the second locomotive controller 42.

The first interconsist communication device 34 may be coupled to the first locomotive controller 32 and the second interconsist communication device 44 may be coupled to the second locomotive controller 42. In a rail vehicle consist with more than one at least one trailing locomotive 14, a locomotive controller 42 on each respective trailing locomotive 14 may communicate with the first locomotive controller 32.

An electronic wheel adhesion level sensor 38, 48 may be used to detect wheel slippage at any axle 26 so that the amount of torque being delivered by the motor 18 can be reduced. The wheel adhesion level sensor 38 may be in electronic communication with the first locomotive controller 32 so that the first locomotive controller 32 can receive traction data/information from the sensor 38. The first locomotive controller 32 may present that data/information to the operator in the cab 22 via a graphical user interface (GUI) or operator display (not shown).

Thus, FIG. 2 illustrates an exemplary system for improving traction control in a train consist 10 comprising a lead locomotive 12 and one or more trailing locomotives 14. The system 30 comprises a first locomotive controller 32 associated with the lead locomotive 12 and a second locomotive controller 42 associated with at least one of the trailing locomotives 14 and in communication with the first locomotive controller 42. The system 30 further comprises a first wheel adhesion level sensor 38 in communication with the first locomotive controller 32 and a second wheel adhesion level sensor 48 in communication with at least one of the second locomotive controllers 42. Each wheel adhesion level sensor 38, 48 is configured to detect a wheel adhesion level at an axle 26 and transmit that data to one of the first or second locomotive controllers 32, 42. The second locomotive controller 42 is configured to receive wheel adhesion level information from the second wheel adhesion level sensor 48 and send that information to the first locomotive controller 32. The first locomotive controller 32 may then adjust the load being delivered to the axles 26 by the traction motors 24 in response to the wheel adhesion level information.

Figure 3:
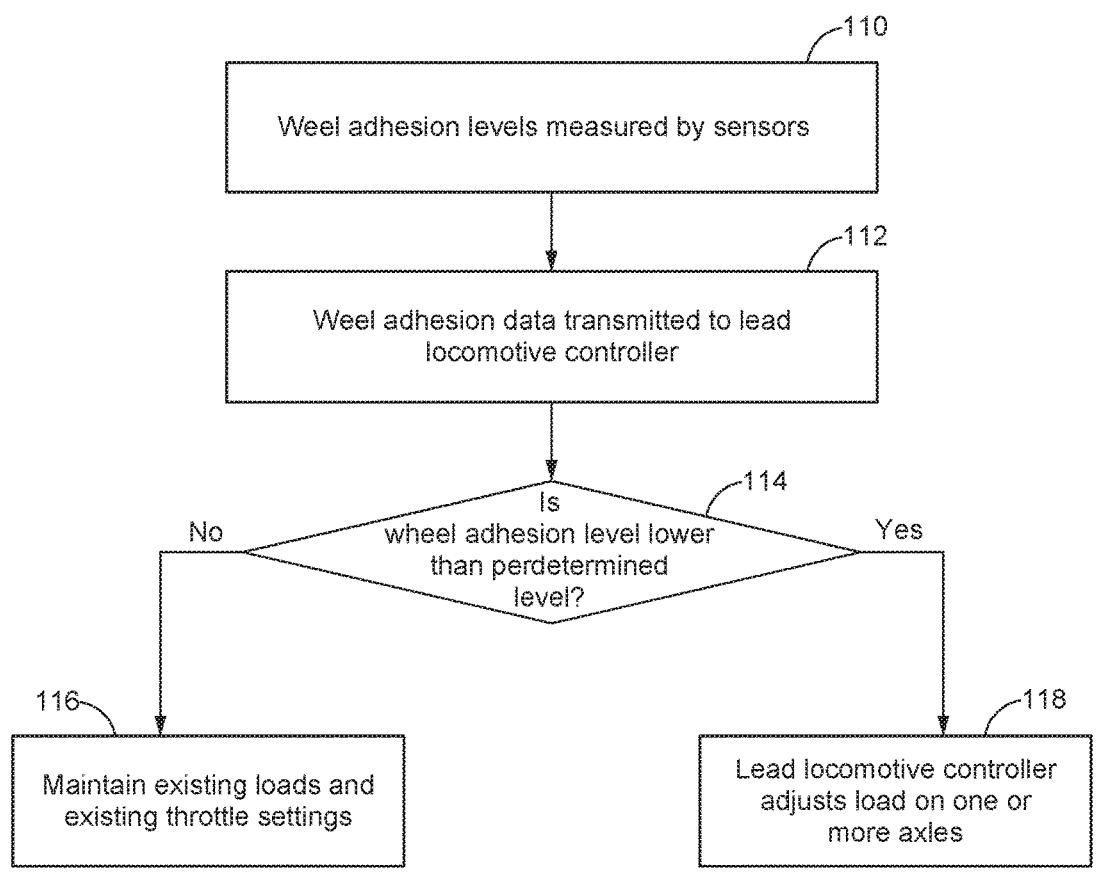
FIG. 3 is a flow chart illustrating a sample sequence of steps which may be practiced in accordance with the teaching of the present disclosure.

FIG. 3 is a flow chart 100 illustrating a sample method which may be performed to adjust traction control on at least one locomotive axle 26 in a rail vehicle consist 10 using the system 30. The method may be performed as an endless logic loop. Like reference numerals are used when describing elements of system 30 as they relate to flowchart 100.

Starting at box 110, the method may comprise the following steps:

Box 110: Each wheel adhesion sensor 38, 48 measures the wheel adhesion level of a corresponding axle 26.

Box 112: The wheel adhesion level sensors 38 of the lead locomotive 12 send this information to the lead locomotive controller 32. The wheel adhesion level sensors 48 of the trailing locomotives 14 send this wheel adhesion level information to the lead locomotive controller 32 typically via a communication link 50. For example, if the wheel adhesion level is below a predetermined level at a particular trailing locomotive axle 26, the trailing locomotive controller 42 may send a low adhesion level signal to the first locomotive controller 32 via a communication link 50.

Box 114: The algorithm logic is performed by the lead locomotive's controller 32. Depending on what the operator is asking for in terms of load and adhesion, the lead locomotive controller 32 may compare the wheel adhesion levels each locomotive axle 26 is experiencing to a predetermined threshold. For example, the predetermined threshold adhesion level might be set to correspond to what the operator might expect it to be at the existing conditions.

Box 116: If the adhesion level is acceptable, for example, equal to or above the predetermined level, the controller 32 or the operator may maintain the existing load settings.

Box 118: But if the adhesion level is under the predetermined level, the controller 32 (or the operator) may adjust the load setting on each locomotive axle 26 to compensate for the locomotive 14 experiencing lower than expected adhesion.

The load (and thus wheel adhesion) may be adjusted by the throttle control. Each locomotive has a throttle control comprising a throttle that can be positioned (set) in a notch representing a throttle level between zero (for idle) and eight. Traditionally, when the operator sets the lead locomotive to notch "5" all the other locomotives are then automatically set at notch "5". With the present system 30, the throttle control may be adjusted by the system 30 in response to feedback from the wheel adhesion level sensors 38, 48 to the lead locomotive controller 32.

On individually controlled locomotives, an algorithm may be used to share the load of a locomotive among the axles 26 in a way to create the most tractive effort. With the addition of inter-consist communication (ICC), the load (and thus the wheel adhesion level) of every axle 26 on every locomotive 12, 14 can be shared and used as an input to a consist control algorithm typically residing on the lead controller 32.

For example, if the axles 26 on the lead locomotive 12 are constantly slipping and not creating full tractive effort values, i.e., not getting full adhesion, then the system 30 can add more load to another locomotive (such as a trailing locomotive 14) to make up for the lost adhesion on the lead locomotive axle 26, or put more load on the other lead locomotive axles 26.

INDUSTRIAL APPLICABILITY

In operation, the present disclosure may find applications in many industries including, but not limited to, rail systems and locomotive assemblies. However, the teachings of the present disclosure need not be so limited but may be applied to any industry needing consistent application of traction with minimal slippage.

Thus there has been described a system and method for adjusting the adhesion level on multiple locomotive axles to optimize wheel adhesion levels (and thus tractive effort) and reduce fuel consumption. The system and method may employ an algorithm to distribute the load of a consist among the lead and trailing locomotives to create the most tractive effort and optimize the wheel adhesion levels. Advantages of the system and method include enabling the locomotives to be run at a lower throttle notch, therefore saving fuel and reducing emissions. In some instances the system and method can reduce the number of locomotives in a consist.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

The invention claimed is:

1. A rail vehicle consist having a load, the consist comprising:
  a lead locomotive including a first controller; and
  one or more trailing locomotives coupled to the lead locomotive, the one or more trailing locomotives including a second controller in communication with the first controller,
  a power source directing power to one or more axles, each axle carrying a set of wheels and being driven by a corresponding traction motor, and
  a wheel adhesion level sensor in communication with the second controller, the wheel adhesion level sensor configured to detect wheel adhesion level at any axle and transmit information regarding wheel adhesion level to the second controller, the second controller configured to receive the information regarding wheel adhesion level from the wheel adhesion level sensor and send that information to the first controller, the first controller being configured to adjust the load being delivered to the axles in response to the wheel adhesion level information.

2. The rail vehicle consist of claim 1 further comprising:
a first interconsist communication device coupled to the first controller and a second interconsist communication device coupled to the second controller.

3. The rail vehicle consist of claim 2, wherein:
the lead locomotive and the at least one trailing locomotive are in communication via a communication link.

4. The rail vehicle consist of claim 3, wherein:
the communication link comprises a multiple unit (MU) jumper cable coupling the lead locomotive to the at least one trailing locomotive.

5. The rail vehicle consist of claim 1 wherein:
the first controller is configured to compare the actual wheel adhesion levels each locomotive axle is experiencing to a predetermined wheel adhesion level, and, if an actual wheel adhesion level is below the predetermined wheel adhesion level, transfer some of the load being experienced by the axle to other locomotive axles.

6. The rail vehicle consist of claim 1 wherein:
the first controller is configured to compare the actual wheel adhesion levels each locomotive axle is experiencing to a predetermined wheel adhesion level and adjust the axle loads.

7. The rail vehicle consist of claim 1 wherein:
the first controller employs an algorithm to distribute the load of the consist among the lead locomotive and the one or more trailing locomotives.

8. The rail vehicle consist of claim 5 further comprising:
means for adjusting the load among the axles.

9. The rail vehicle consist of claim 8 wherein:
the means for adjusting the load comprises a throttle control.

10. A system for adjusting wheel adhesion levels on multiple locomotive axles in a rail vehicle consist, the consist having a load and comprising a lead locomotive and one or more trailing locomotives coupled to the lead locomotive, each locomotive comprising a power source for directing power to one or more axles, each axle carrying a set of wheels and being driven by a corresponding traction motor, the system comprising:
a first controller associated with the lead locomotive;
a second controller associated with the one or more trailing locomotives and in communication with the first controller; and
a first wheel adhesion level sensor in communication with the first controller and a second wheel adhesion level sensor in communication with each second controller, each wheel adhesion level sensor configured to detect a wheel adhesion level at an axle and transmit that level to one of the first or second controllers, the second controller configured to receive wheel adhesion level information from a second wheel adhesion level sensor and send that information to the first controller, the first controller being configured to adjust the load being delivered to the axles in response to the wheel adhesion level information.

11. The system of claim 10 further comprising:
a first interconsist communication device coupled to the first controller and a second interconsist communication device coupled to the second controller.

12. The system of claim 11, wherein:
the lead locomotive and the at least one trailing locomotive are in communication via a communication link.

13. The system of claim 12, wherein:
the communication link comprises a multiple unit (MU) jumper cable coupling the lead locomotive to the at least one trailing locomotive.

14. The system of claim 13 wherein:
the first controller is configured to compare the actual wheel adhesion levels each locomotive axle is experiencing to a predetermined wheel adhesion level, and, if an actual wheel adhesion level is below the predetermined wheel adhesion level, transfer some of the load being experienced by the axle to other locomotive axles.

15. The system of claim 14 wherein:
the first controller is configured to compare the actual wheel adhesion levels each locomotive axle is experiencing to a predetermined wheel adhesion level and adjust the axle loads.

16. The system of claim 15 wherein:
the first controller employs an algorithm to distribute the load of the consist among the lead locomotive and the one or more trailing locomotives.

17. The system of claim 14 further comprising:
means for adjusting the load among the axles.

18. The system of claim 17 wherein:
the means for adjusting the load comprises a throttle control.

19. A method for adjusting an adhesion level of at least one locomotive axle in a rail consist, the consist having a load and comprising a lead locomotive and one or more trailing locomotives coupled to the lead locomotive, each locomotive comprising a power source for directing power to the axles, each axle carrying a set of wheels and being driven by a corresponding traction motor, the method comprising:
monitoring the adhesion level of an axle associated with the lead locomotive via a wheel adhesion level sensor using a first controller associated with the lead locomotive;
monitoring the adhesion level of an axle associated with a trailing locomotive via a wheel adhesion level sensor using a second controller associated with the trailing locomotive;
communicating a low adhesion level signal to a first or second controller when the wheel adhesion level sensor monitors an adhesion level of an axle lower than a predetermined level; and
adjusting the power being delivered to the low adhesion level axle by the power source in response to the low adhesion level signal.

20. The method of claim 19 wherein:
the adjusting step comprises changing the throttle notch setting associated with the low adhesion level axle.

* * * * *